United States Patent
Jiang et al.

(10) Patent No.: US 7,098,252 B2
(45) Date of Patent: Aug. 29, 2006

(54) PREPARATION OF MACRORETICULAR POLYMERS

(75) Inventors: Biwang Jiang, Horsham, PA (US); Garth Rockwood Parker, Jr., Lansdale, PA (US)

(73) Assignee: Rohm and Haas Company, Philadelphia, PA (US)

( * ) Notice: Subject to any disclaimer, the term of this patent is extended or adjusted under 35 U.S.C. 154(b) by 401 days.

(21) Appl. No.: 10/113,311

(22) Filed: Apr. 1, 2002

(65) Prior Publication Data

US 2003/0187080 A1 Oct. 2, 2003

(51) Int. Cl.
*C08J 5/20* (2006.01)

(52) U.S. Cl. .............................. 521/25; 521/30; 521/32; 521/37; 526/194

(58) Field of Classification Search ................. 525/194; 521/25, 30, 32, 37
See application file for complete search history.

(56) References Cited

U.S. PATENT DOCUMENTS

| | | | |
|---|---|---|---|
| 3,635,852 A | 1/1972 | Finestone et al. | |
| 3,657,164 A | 4/1972 | Jastrow et al. | |
| 5,073,365 A * | 12/1991 | Katz et al. | 427/2.24 |
| 5,135,740 A * | 8/1992 | Katz et al. | 424/401 |
| 5,830,967 A | 11/1998 | Sojka | 526/323.2 |
| 5,955,552 A | 9/1999 | Sojka | 526/88 |
| 6,107,429 A | 8/2000 | Sojka | 526/323.2 |
| 6,323,249 B1 | 11/2001 | Dale et al. | 521/38 |

FOREIGN PATENT DOCUMENTS

| | | |
|---|---|---|
| EP | 0135292 A1 | 7/1983 |
| JP | 03168204 | 7/1991 |

* cited by examiner

*Primary Examiner*—Bernard Lipman
(74) *Attorney, Agent, or Firm*—Thomas D. Rogerson; David T. Banchik

(57) ABSTRACT

The present invention relates to a method of preparing porous macroreticular polymers comprising polymerizing one or more monoethylenically unsaturated monomers in the presence of a silicone based porogen.

6 Claims, No Drawings

PREPARATION OF MACRORETICULAR POLYMERS

BACKGROUND

The preparation of macroreticular copolymers is known to those skilled in the art. See, EP 0135292 which discloses a method for preparing macroreticular resins using macromolecular porogens such as polyvinylmethyl ether and polyethylene oxide. The monomers used to prepare said resins are monoethylenically unsaturated monomers such as styrene and polyethylenically unsaturated monomers such as divinylbenzene. Further, U.S. Pat. No. 6,107,429 discloses a microporous oil and water sorbent microparticle comprising a copolymer of a first diethylenically unsaturated monomer and a second diethylenically unsaturated monomer, in a mole ratio of about 1:1 to about 1:2, wherein the microparticle has a mean unit diameter of less than about 50 microns, a bulk density of about 0.008 to about 0.1 g/mL, and a total sorption capacity for mineral oil that is 72% by weight or greater. The preferred diethylenically unsaturated monomers are allylmethacrylate and ethylene glycol dimethacrylate. Silicone porogens such as hexamethyldisiloxane are disclosed. U.S. Pat. No. 5,830,967 discloses microporous and oil sorbent microparticles comprising a terpolymer of diethylenically unsaturated monomers such as butyl methacrylate, allyl methacrylate and an ethylene glycol dimethacrylate, in a mole ratio of about 1:3 to 5:5 to 7 respectively, said particle characterized by having a mean unit diameter of less than about 50 microns and a total sorption capacity for mineral oil that is 72% by weight or greater. Silicone porogens such as hexamethyldisiloxane are disclosed. U.S. Pat. No. 5,955,552 discloses a process for producing the aforementioned microporous oil sorbent micropolymers. U.S. Pat. No. 6,323,249 discloses a method for producing porous resins using monoethylenically and polyethylenically unsaturated monomers and a polyalkylene oxide as a porogen.

Now, Applicant has enhanced the art of preparing macroreticular polymers by discovering a method for preparing macroreticular polymers from substantially monoethylenically unsaturated monomers in the presence of a silicone porogen such as hexamethyldisiloxane. The ion exchange resins derived from these macroreticular polymers have high volume capacity, high weight capacity, and high physical stability as measured by resistance to osmotic shock and attrition.

The following terms have the following meanings herein:

Ion exchange resins are characterized by their capacity to exchange ions. This is expressed as the "Ion Exchange Capacity." For cation exchange resins the term used is "Cation Exchange Capacity," and for anion exchange resins the term used is "Anion Exchange Capacity." The ion exchange capacity is measured as the number equivalents of an ion that can be exchanged and can be expressed with reference to the mass of the polymer (herein abbreviated to "Weight Capacity") or its volume (often abbreviated to "Volume Capacity"). A frequently used unit for weight capacity is "milliequivalents of exchange capacity per gram of dry polymer." This is commonly abbreviated to "meq/g."

Physical Stability is measured by resistance to "Osmotic Shock" and "Attrition". Osmotic shock is the expansion or contraction of resin beads due to either the volume change imposed by repeated applications of dilute and concentrated solutions, or the volume change imposed by repeated changes in the ionic form of the resin beads. Attrition is the breakage and abrasion of resin beads due to mechanical stresses. The test of osmotic shock and attrition measures the ability of an ion exchange materials to resist physical degradation due to the synergistic effects of both osmotic shock and attrition. The test is carried out by repeated cycles of resin exhaustion and regeneration using concentrated reagents and impact at high velocity against a fixed screen, followed by a determination of the percentage of ion exchange resin beads that broke.

SUMMARY OF THE INVENTION

The present invention relates to a method of preparing macroreticular polymers comprising polymerizing one or more monoethylenically unsaturated monomers in the presence of a silicone based porogen selected from the group including, but not limited to, hexamethyldisiloxane, poly(dimethylsiloxane), poly(dimethylcyclosiloxane), decamethylcyclopentasiloxane, octakis (dimethylsilyloxy) silsesquioxane, octamethylcyclotetrasiloxane, octamethyltrisiloxane, hexamethylcyclotrisiloxane, hexaphenylcyclotrisiloxane, poly(dimethylsiloxane-co-alkylmethylsiloxane), poly[dimethylsiloxane-co-(3-aminopropyl)methylsiloxane], poly(dimethylsiloxane-co-diphenylsiloxane), poly(dimethylsiloxane) diglycidyl ether terminated, poly(dimethylsiloxane) ethoxylate or propoxylate, poly(dimethylsiloxane-co-methylhydrosiloxane), poly(dimethylsiloxane-co-methylphenylsiloxane), poly[dimethylsiloxane-co-methyl (stearoyloxyalkyl)siloxane], poly(dimethylsiloxane)-graft-polyacrylates, and poly(dimethylsiloxane) hydroxy terminated and mixtures thereof.

DETAILED DESCRIPTION OF THE INVENTION

The present invention relates to a method of preparing macroreticular polymers comprising polymerizing one or more monoethylenically unsaturated monomers in the presence of a silicone based porogen selected from the group including, but not limited to, hexamethyldisiloxane, poly(dimethylsiloxane), poly(dimethylcyclosiloxane), decamethylcyclopentasiloxane, octakis (dimethylsilyloxy) silsesquioxane, octamethylcyclotetrasiloxane, octamethyltrisiloxane, hexamethylcyclotrisiloxane, hexaphenylcyclotrisiloxane, poly(dimethylsiloxane-co-alkylmethylsiloxane), poly[dimethylsiloxane-co-(3-aminopropyl)methylsiloxane], poly(dimethylsiloxane-co-diphenylsiloxane), poly(dimethylsiloxane) diglycidyl ether terminated, poly(dimethylsiloxane) ethoxylate or propoxylate, poly(dimethylsiloxane-co-methylhydrosiloxane), poly(dimethylsiloxane-co-methylphenylsiloxane), poly[dimethylsiloxane-co-methyl (stearoyloxyalkyl)siloxane], poly(dimethylsiloxane)-graft-polyacrylates, and poly(dimethylsiloxane) hydroxy terminated and mixtures thereof.

Monoethylenically unsaturated monomers useful in the practice of the present invention include, but are not limited to, the following: styrene, vinyl pyridine, ethylvinylbenzene, vinyltoluene, and esters of acrylic and methacrylic acid, including the methyl, ethyl, propyl, isopropyl, butyl, sec-butyl, tert-butyl, amyl, hexyl, octyl, ethylhexyl, decyl, dodecyl, cyclohexyl, isobornyl, phenyl, benzyl, alkylphenyl, ethoxymethyl, ethoxyethyl, ethoxypropyl, propoxymethyl, propoxyethyl, propoxypropyl, ethoxyphenyl, ethoxybenzyl, and ethoxycyclohexyl esters; vinyl esters, including vinyl acetate, vinyl propionate, vinyl butyrate and vinyl laurate; vinyl ketones, including vinyl methyl ketone, vinyl ethyl ketone, vinyl isopropyl ketone, and methyl isopropenyl ketone; vinyl ethers, including vinyl methyl ether, vinyl ethyl ether, vinyl propyl ether, and vinyl isobutyl ether; the monomethacrylates of dialkylene glycols and polyalkylene glycols.

The more preferred monoethylenically unsaturated monomers are styrene, vinyl pyridine, ethylvinylbenzene, vinyltoluene, and esters of acrylic and methacrylic acids.

The most preferred monoethylenically unsaturated monomers are styrene, ethylvinylbenzene, and vinyltoluene.

The preferred level of monoethylenically unsaturated monomer is 50–99 percent by weight, the more preferred level is 80–98 percent by weight, and the most preferred level is 90–98 percent by weight.

Polyethylenically unsaturated monomers are added as crosslinkers. Polyethylenically unsaturated monomers include, but are not limited to, the following: divinyl benzene, divinyl toluene, divinyl naphthalene, trivinylbenzene; alkyldivinyl-benzenes having from 1 to 4 alkyl groups of 1 to 2 carbon atoms substituted on the benzene nucleus; alkyltrivinylbenzenes having 1 to 3 alkyl groups of 1 to 2 carbon atoms substituted on the benzene nucleus; trivinylnaphthalenese, and polyvinylanthracenes, glycerine dimethacrylate, glycerine trimethacrylate, diallyl maleate, diallyl phthalate, diallyl monoethylene glycol citrate, ethylene glycol vinyl allyl citrate, allyl vinyl maleate, diallyl itaconate, diallyl carbonate, diallyl oxalate, diallyl silicate, divinyl sulfone, divinyl ether, trimethylolpropane di- and triacrylate or methacrylate, triacrylate or trimethacrylate, and triethylene glycol dimethacrylate.

The more preferred polyethylenically unsaturated monomers are divinylbenzene, trivinylbenzene, ethylene glycol diacrylate, diallyl phthalate, and trimethylolpropane trimethacrylate.

The most preferred polyethylenically unsaturated monomers are divinylbenzene and trimethylolpropane trimethacrylate.

The preferred level of polyethylenically unsaturated monomer is 1–50 percent by weight, the more preferred level is 2–20 percent by weight, and the most preferred level is 2–10 percent by weight.

Porogens useful in the practice of the present invention include, but are not limited to, the following: hexamethyldisiloxane, poly(dimethylsiloxane), polydimethylcyclosiloxane, decamethylcyclopentasiloxane, octakis (dimethylsilyloxy)silsesquioxane, octamethylcyclotetrasiloxane, octamethyltrisiloxane, hexamethylcyclotrisiloxane, hexaphenylcyclotrisiloxane, poly(dimethylsiloxane-co-alkylmethylsiloxane), poly[dimethylsiloxane-co-(3-aminopropyl)methylsiloxane], poly(dimethylsiloxane-co-diphenylsiloxane), poly(dimethylsiloxane), diglycidyl ether terminated, poly(dimethylsiloxane) ethoxylate or propoxylate, poly(dimethylsiloxane-co-methylhydrosiloxane), poly(dimethylsiloxane-co-methylphenylsiloxane), poly[dimethylsiloxane-co-methyl(stearoyloxyalkyl)siloxane], poly(dimethylsiloxane)-graft-polyacrylates, and poly(dimethylsiloxane) hydroxy terminated and mixtures thereof.

The more preferred porogens are hexamethyldisiloxane, octamethyltrisiloxane, poly(dimethylsiloxane), polydimethylcyclosiloxane, hexamethylcyclotrisiloxane hexaphenylcyclotrisiloxane, decamethylcylopentasiloxane, poly(dimethylsiloxane-co-methylphenylsiloxane), poly(dimethylsiloxane)-graft-polyacrylates and mixtures thereof.

The most preferred porogens are hexamethyldisiloxane, poly(dimethylsiloxane), polydimethylcyclosiloxane, decamethylcylopentasiloxane, and poly(dimethylsiloxane-co-methylphenylsiloxane) and mixtures thereof.

The porogen is used at levels of 2 to 60% by weight of the total monomer phase. More preferably, the porogen is used at 6 to 45% of the total monomer phase. The most preferred level of porogen is 8 to 38% of the total monomer phase.

The process of the present invention can be run using suspension polymerization techniques. Suspension polymerization techniques are well known to those skilled in the art. The standard method for suspension polymerization involves: Adding a mixture of monomer, porogen and initiators as an oil phase to an aqueous medium containing suspension stabilizers. Spherical oil phases are formed by stirring the resulting mixture, the droplet size can be controlled by conventional methods such as the selection of the suspension stabilizer, the type of agitator, and the stirring rate. The polymerization is started by elevating the temperature of the suspension. The polymerization temperature is determined according to the kind of radical initiator utilized, and generally is in the range of from about 50° C. to about 100° C. The polymerization is continued at the temperature until the polymerization of monomers reaches a desirable value. This polymerization time is preferably about 4 hr to about 15 hr. After the polymerization, the macroreticular beads are separated from the aqueous phase by filtration and the washed with water to remove the suspension stabilizer. The porogen is then removed according to methods known to those skilled in the art such as solvent extraction or simple distillation.

Suitable suspension agents and stabilizers used in suspension polymerization include, but are not limited to, the following: polyvinylalcohol, methyl cellulose, carboxymethylcellulose, hydroxyethyl cellulose, poly(vinyl pyrrolidine), polyacrylate salts, polymethyacrylate salts, dimethyldialkylammonium polymers, nitrite and dichromatic salts, calcium phosphate salts, carbonate salts, sulfate salts, gum arabic, lignosulfonates, and gelatine. One or more suspension agents could be added into the aqueous solution to prevent coalescence or breakup of the monomer droplets and thus maintain the monomer dispersion.

Suspension polymerization requires initiators, i.e., a catalyst, to cause polymerization to occur in the organic phase solvent. However, other methods of initiating polymerization can be used instead, such as UV light, actinic radiation, or the like. Suitable catalysts which provide free radicals which function as reaction initiators include benzoyl peroxide, tert-butyl hydroperoxide, cumene peroxide, tetralin peroxide, acetyl peroxide, caproyl peroxide, tert-butyl perbenzoate, tert-butyl diperphthalate, and methyl ethyl ketone peroxide. Selection of initiators and amount can somewhat affect the resulting macroreticular resin properties. Also, azo-initiators are useful as catalysts. Useful azo-initiators are 2,2'-azobisisobutyronitrile and 2,2'-azobis (2,4-dimethylpentanenitrile). An especially preferred azo initiator is 2,2'-azobis (2,4dimethylpentanenitrile), which is commercially available under the trade name VAZO 52 from DuPont, Wilmington, Del. A typical effective amount of organic initiator relative to dry monomer was found to be about 0.5 to about 2% by weight, preferably about 0.8 to about 1.5% by weight. Redox initiator systems are also useful as catalysts.

It is known that standard suspension polymerization only gives copolymer beads with a relatively broad size distribution. A monodisperse or narrower size distribution of macroreticular copolymer beads can be obtained by screening or the vibration jetting processes disclosed in U.S. Pat. Nos. 3,922,255 and 4,444,961. In these jetting methods, uniform droplets of oil phase containing monomers, porogen and initiators are delivered into an aqueous system with suspension agents in it. The conditions are controlled to prevent the coalescence or breakup of the monomer droplets, and thus maintain the size uniformity of these droplets during both the jetting process and polymerization. After polymerization to the desired level the resulting uniform macroreticular polymers are isolated. The porogen is then removed according to methods known to those skilled in the art.

The macroreticular polymers prepared according to the present invention can be converted to ion exchange resins according to functionalization methods known to those skilled in the art. For example, the macroreticular polymer can be sulfonated with sulfuric acid, oleum, sulfur trioxide, or chlorosulfonic acid to form cation exchange resins. The macroreticular polymer can also be chloroalkylated and subsequently aminated to form anion exchange resins. These functionalizations techniques are well known to those skilled in the art. See, Encyclopedia of Polymer Science and Engineering, Vol 8, 2nd Edition, John Wiley & Sons, 1987. pp341–393:

The following non limiting examples illustrate the practice of the present invention.

EXAMPLE 1

Into a four-necked flask equipped with stirrer, thermometer, and reflux condenser were added 650 g of aqueous solution containing Geletin (1.5 g) and Poly (diallyldimethylammonium chloride) (2.3 g). A mixture of Styrene (300 g), Divinylbenzene (24 g, 55% concentration), Benzoyl peroxide (4.3 g, 75%), and Hexamethyldisiloxane (132 g) was charged to above aqueous phase. Agitation was applied so that the organic phase was dispersed in the form of fine droplets. The mixture was then heated to 79–82° C. over 1 hr and held for about 10 hrs. The opaque macroreticular polymer beads with broad size distribution were then separated by filtration and water wash. The porogen, hexamethyldisiloxane, was removed by isopropanol extraction followed by water wash. The final polymer beads were dried prior to functionalization. Said polymer beads were functionalized by chloromethylation and amination with trimethylamine using the process disclosed in U.S. Pat. No. 4,900,796 to produce strong base anion exchange resins.

EXAMPLE 2

Uniform macroreticular polymer beads prepared as in Example 1 were jetted as described in U.S. Pat. No. 4,579,718. The average copolymer particle size is 0.42 mm with a uniformity coefficient of 1.1. The polymer beads were isolated from the aqueous phase, the porogen removed, and the beads purified according to methods known to those skilled in the art. The dry polymer beads were functionalized by chloromethylation and amination to produce strong base anion exchange resins.

EXAMPLE 3

Opaque macroreticular polymer beads were produced using the same process as described in Example 1 except that the hexamethyldisiloxane was decreased to 27% of total monomer phase. In this case the monomer phase comprised: Styrene (300 g), Divinylbenzene (24 g, 55% concentration), Benzoyl peroxide (4.3 g, 75%) and Hexamethyldisiloxane (120 g). The copolymer beads were isolated from the aqueous phase, the porogen removed, and the beads purified according to methods known to those skilled in the art. The dry copolymer beads were functionalized by chloromethylation and amination to produce strong base anion exchange resins.

EXAMPLE 4

Opaque macroreticular polymer beads were produced using the same process as described in Example 1 except the porogen hexamethyldisiloxane was raised to 30% of total monomer phase. In this case the monomer phase comprised: Styrene (300 g), Divinylbenzene (24 g, 55% concentration, Benzoyl peroxide (4.3 g, 75%) and Hexamethyldisiloxane (138 g). The polymer beads were isolated from the aqueous phase, the porogen removed, and the beads purified according to methods known to those skilled in the art. The dry polymer beads were functionalized by chloromethylation and amination to produce strong base anion exchange resins.

EXAMPLE 5

Opaque macroreticular polymer beads were produced using the same process as described in Example 1 except that porogen hexamethyldisiloxane was replaced by poly (dimethylsiloxane), and the porogen level was reduced to 12% of total monomer phase. In this case the monomer phase comprised: Styrene (300 g), Divinylbenzene (24 g, 55% concentration), Benzoyl peroxide (4.3 g, 75%) and Poly(dimethylsiloxane), (44 g, viscosity 20 cSt). The copolymer beads were isolated from the aqueous phase, the porogen removed, and the beads purified according to methods known to those skilled in the art. The dry copolymer beads were functionalized by chloromethylation and amination to produce strong base anion exchange resins.

EXAMPLE 6

Opaque copolymer beads were produced using the same process as described in Example 1 except that porogen hexamethyldisiloxane was replaced by Decamethylcylopentasiloxane and the porogen level was increased to 35% of total monomer phase. In this case the monomer phase comprised: Styrene (300 g), Divinylbenzene (24 g, 55% concentration), Benzoyl peroxide (4.3 g, 75%) and Decamethylcylopentasiloxane (174 g). The copolymer beads were isolated from the aqueous phase, the porogen removed, and the beads purified according to methods known to those skilled in the art. The dry copolymer beads were functionalized by chloromethylation and amination to produce strong base anion exchange resins.

EXAMPLE 7

Opaque copolymer beads were produced using the same process as described in Example 1 except that the porogen, hexamethyldisiloxane, was replaced by poly (dimethyldisiloxane) and the porogen level was decreased to 4% of total monomer phase. In this case the monomer phase comprised: Styrene (300 g), Divinylbenzene (24 g, 55% concentration), Benzoyl peroxide (4.3 g, 75%) and poly (dimethylsiloxane) (13 g). The isolated copolymer beads have an opaque appearance.

We claim:

1. A method of making macroreticular beads resistant to osmotic shock and attrition comprising polymerizing one or more monoethylenically unsaturated monomers in the presence of a silicone based porogen, to form unbroken beads; and, functionalizing said unbroken beads.

2. The method of claim 1 in which said silicone based porogen is selected from the group consisting of hexamethyldisiloxane, poly(dimethylsiloxane), poly(dimethylcyclosiloxane), decamethylcyclopentasiloxane, octakis(dimethylsilyloxy)silsesquioxane, octamethylcyclotetrasiloxane, octamethyltrisiloxane, hexamethylcyclotrisiloxane, hexaphenylcyclotrisiloxane, poly(dimethylsiloxane-co-alkylmethylsiloxane), poly[dimethylsiloxane-co-(3-aminopropyl)methylsiloxane], poly(dimethylsiloxane-co-diphenylsiloxane), poly(dimethylsiloxane) diglycidyl ether terminated, poly(dimethylsiloxane) ethoxylate or propoxylate, poly(dimethylsiloxane-co-methylhydrosiloxane), poly(dimethylsiloxane-co-methylphenylsiloxane), poly[dimethylsiloxane-co-methyl(stearoyloxyalkyl)siloxane], poly(dimethylsiloxane)-graft-polyacrylates, and poly(dimethylsiloxane) hydroxy terminated and mixtures thereof.

3. A method of making macroreticular beads resistant to osmotic shock and attrition comprising polymerizing one or more monoethylenically unsaturated monomers and a divinylbenzene cross linker in the presence of a silicone based porogen, in which polymers form unbroken beads; and functionalizing said unbroken beads.

4. The method of claim 3 in which said silicone based porogen is selected from the group consisting of hexamethyldisiloxane, poly(dimethylsiloxane), polydimethylcyclosiloxane, decamethylcylopentasiloxane, and poly(dimethylsiloxane-co-methylphenylsiloxane) and mixtures thereof.

5. A method of making macroreticular beads resistant to osmotic shock and attrition comprising polymerizing in the presence of a silicone based porogen:

(a) 90–98 percent by weight monoethylenically unsaturated monomers, and, (b) 2–10 percent by weight polyethylenically unsaturated monomers, to form unbroken beads; and, functionalizing said unbroken beads.

6. The method of claim 5 in which said silicone based porogen is selected from the group consisting of hexamethyldisiloxane, poly(dimethylsiloxane), polydimethylcyclosiloxane, decamethylcylopentasiloxane, and poly(dimethylsiloxane-co-methylphenylsiloxane) and mixtures thereof.

* * * * *